United States Patent [19]

Wiesemann

[11] Patent Number: 5,102,536
[45] Date of Patent: Apr. 7, 1992

[54] SELF-CLEANING WATER FILTER SCREEN APPARATUS

[75] Inventor: Bruce O. Wiesemann, Largo, Fla.

[73] Assignee: Wiesemann Engineering, Inc., Largo, Fla.

[21] Appl. No.: 509,032

[22] Filed: Apr. 13, 1990

[51] Int. Cl.$^5$ .............................................. B01D 33/04
[52] U.S. Cl. ..................... 210/158; 209/307; 209/308; 209/392; 210/159; 210/160; 210/400
[58] Field of Search ............... 210/160, 158, 159, 161, 210/400; 198/495, 851; 209/307, 308, 392

[56] References Cited

U.S. PATENT DOCUMENTS 4,812,231 3/1989 Wiesemann ...................... 210/160

Primary Examiner—Frank Sever
Attorney, Agent, or Firm—Herbert W. Larson

[57] ABSTRACT

An apparatus is described which separates small solids from process waste water. A continuously rotating elongated drum screen having a large diameter interior flow channel removes the solids. The drum screen contains a continuous loop of closely spaced link members each having a foot at one end projecting towards the interior of the drum chambr. Pivot members are connected to the links and these pivot members are driven by lugs attached to an endless loop chain. The chain is driven by variable speed motors. A flushing system mounted on top of the drum screen washes solids into a hopper where liquid is returned to the drum inner chamber and solids are sent to solid waste disposal.

7 Claims, 8 Drawing Sheets

SELF-CLEANING WATER FILTER SCREEN APPARATUS

BACKGROUND OF THE INVENTION

1. Field of the Invention

This invention relates to an apparatus for filtering particles from water. More particularly, it refers to an apparatus designed to remove algae and other debris larger than 0.5 mm. from a water effluent line.

2. Description of the Prior Art

U.S. Pat. No. 4,812,231 describes an apparatus which filters particles larger than 0.5 mm from a water water stream without needing a sand filter system. The apparatus achieves its intended purpose with a series of pivot members supporting an assembly of spaced apart straight links forming endless loop sections. These sections move in an elliptical path along the interior of the water filter apparatus receiving chamber. It has now been found that although the filter screen apparatus of U.S. Pat. No. 4,812,231 performs its purpose satisfactorily, solid fecal matter is sometimes not crushed and strained out of the inner chamber of the drum housing. A modified screen filter apparatus is needed in order to achieve the complete break up of fecal matter so that it will be acceptable for receipt by waste disposal facilities.

SUMMARY OF THE INVENTION

I have now found that the use of a projecting foot at one end of each link member and a repositioning of the pivot members and driving mechanisms in a rotating filter screen achieves the complete break up of the solid fecal matter and makes it acceptable for receipt by waste disposal facilities.

My improved apparatus employs a drum type filter chamber having suspended therein a continuous loop of closely spaced link members each having a foot at one end projecting towards the inner waste water receiving chamber of the filter apparatus. Pivot members are connected to the links by supporting rods. The pivot members are driven by lugs integral with an endless loop chain which in turn is driven by a gear connected to an externally mounted variable speed motor.

As in the filter apparatus described in U.S. Pat. No. 4,812,231, the front end of the drum is open to allow the waste effluent to flow into the inner drum chamber. The water moves out through the sides and bottom of the drum chamber after passing between the links. Particles larger than 0.5 mm. are trapped on or between the links and are moved upwards in the inner chamber as the links rotate in their elliptical pattern. A back baffle in the inner drum chamber prevents water from flowing through the chamber.

As the links move upward and reach the top or overhead position with respect to the drum chamber, a pair of water headers mounted above the chamber emit a water wash to flush the links. The debris caught between the links or entrained on the inner surface of the links drip into a hopper and then by gravity into a compactor mounted below the overhead portion of the drum chamber. A pipe carries the solid debris out of the drum chamber to a collection container. Liquified fecal matter falls through small openings in the bottom of the compactor into the drum chamber where it flows out with the filtered water effluent.

BRIEF DESCRIPTION OF THE DRAWINGS

The invention may be best understood by those having ordinary skill in the art by reference to the following detailed description when considered in conjunction with the accompanying drawings in which.

DETAILED DESCRIPTION OF THE INVENTION

Figure 1:
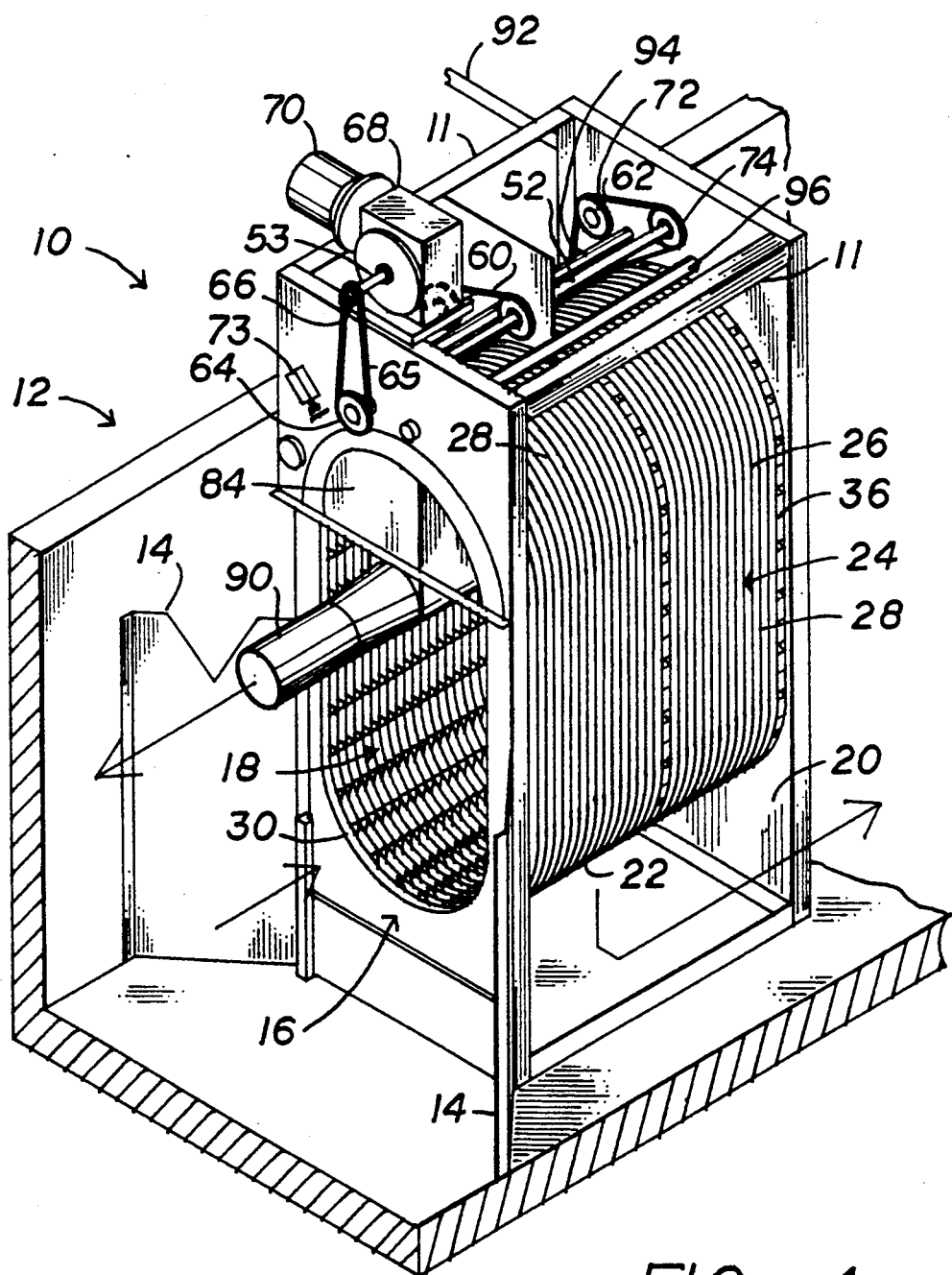
FIG. 1 is a perspective view of the drum chamber and filter screen apparatus positioned in a water effluent stream.

Throughout the following detailed description, the same reference numerals refer to the same elements in all figures.

The self cleaning filter screen apparatus 10 shown in FIG. 1 is mounted on a supporting frame 11 within a waste water effluent channel 12 with a weir 14 on each side of an opening 16 into the water filter screen apparatus 10. An inner chamber 18 receives the waste water effluent and a rear baffle wall 20 deflects the water so that it exits at the bottom 22 or at the sides 24 of the water filter screen apparatus 10.

Figure 12:
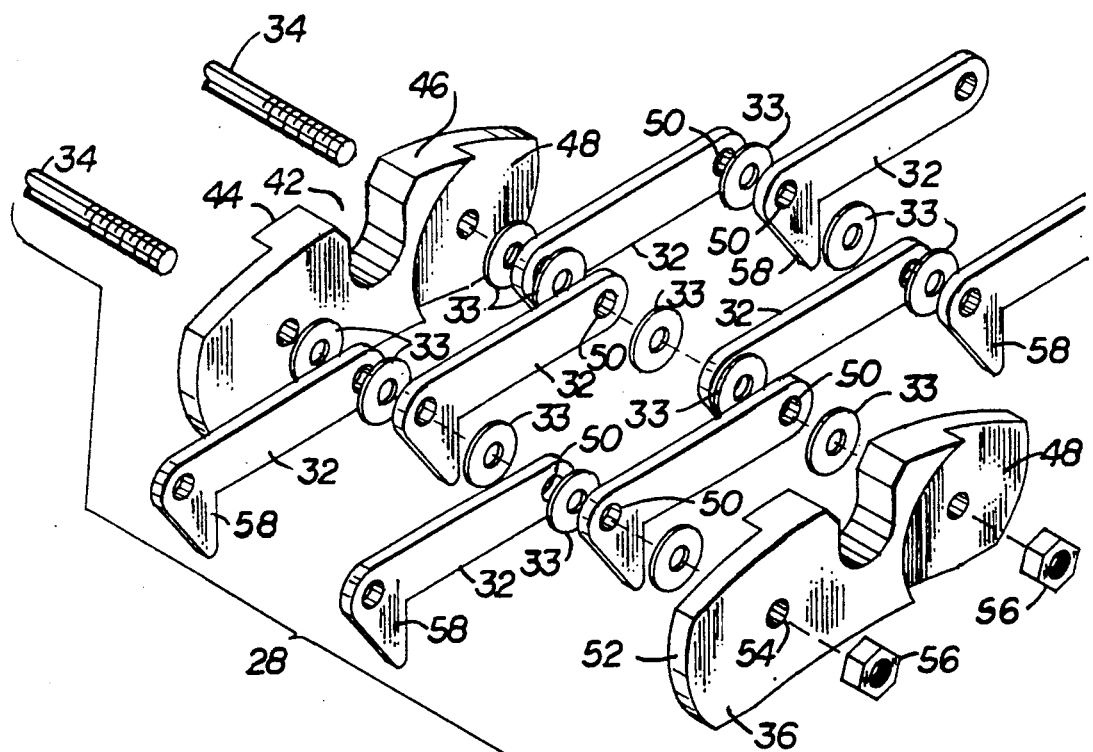
FIG. 12 is an exploded view of the links, the pivot members and its mounting rods.
Figure 13:
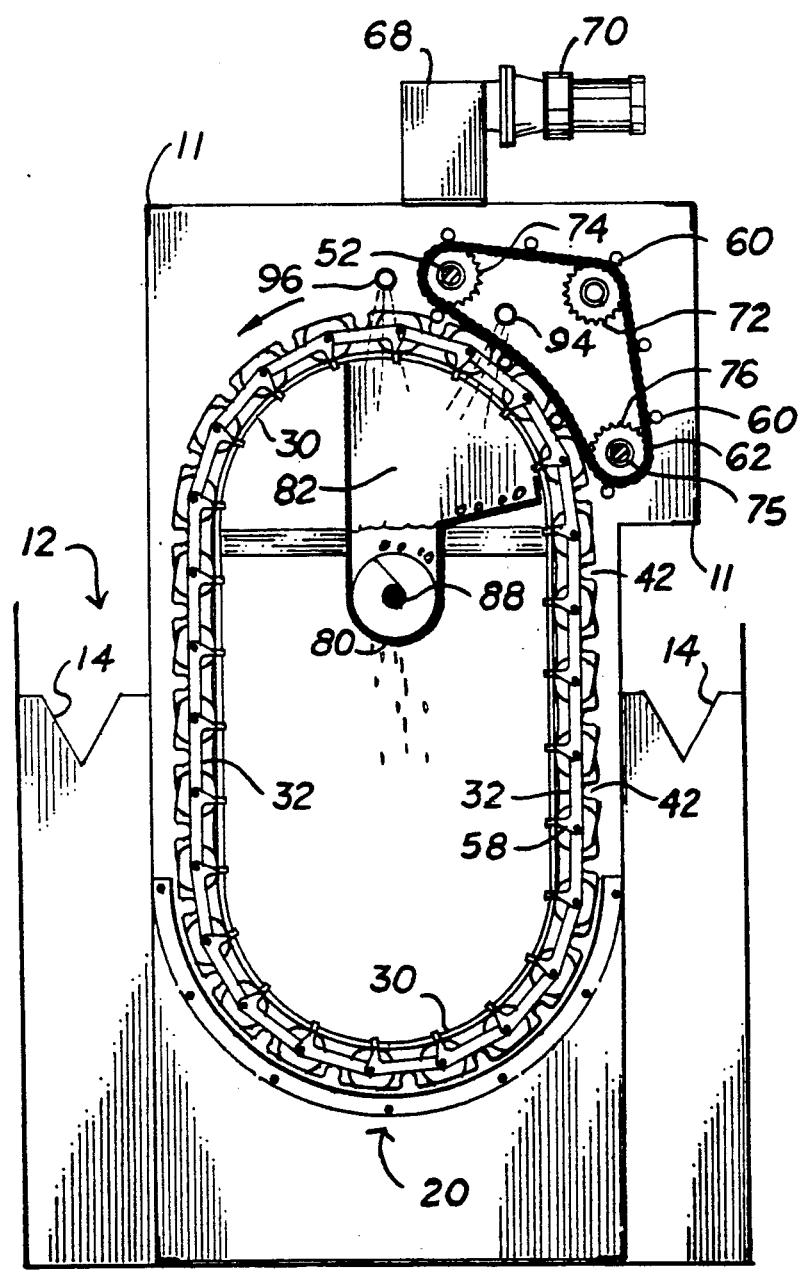
FIG. 13 is a cut away side elevation of the filter screen along lines 13—13 of FIG. 5.

Debris contained within the water larger than 0.5 mm. is entrained on the inner surface of the drum chamber 18 on or between links 32. The drum chamber 18 is enclosed by a rotating screen assembly 26 formed by two endless loop filter sections 28. Each filter section 28 is a continuous elliptical loop formed from multiple spaced apart links 32. The links 32 are connected together as shown in FIG. 12. The multiple links 32 are supported by rods 34 connecting to a pivot member 36 on each side. The pivot members move within a guide track 30. Link washers 33 are used to increase the space between links 32 when the filter screen is used to filter larger particles.

Figure 7:
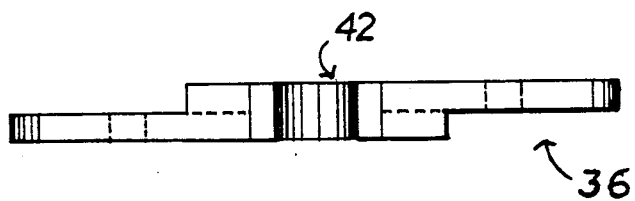
FIG. 7 is a top plan view of a screen pivot member.
Figure 8:
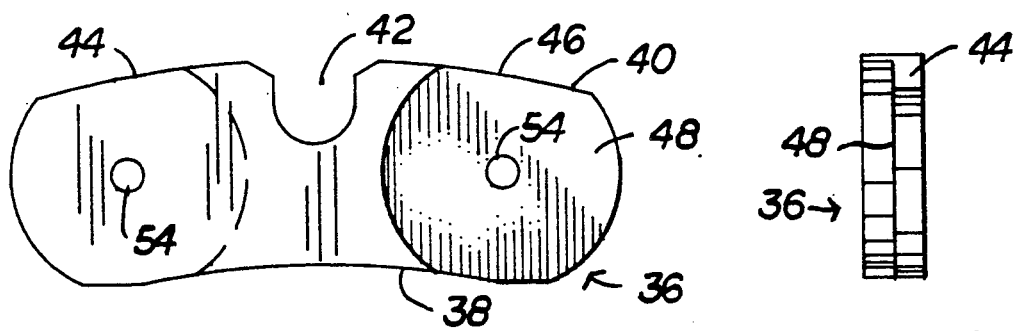
FIG. 8 is a front elevation view of a pivot member.
Figure 9:
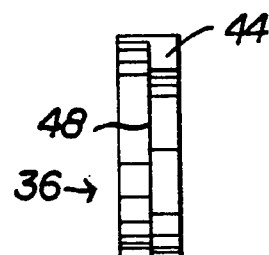
FIG. 9 is an end view of a pivot member.
Figure 10:
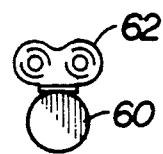
FIG. 10 is a side view of a drive chain lug.
Figure 11:
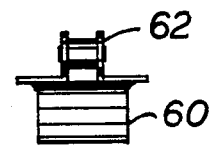
FIG. 11 is an end view of a drive chain lug.

The pivot member 36 as shown in FIGS. 7-9 has a bottom surface 38 and a top surface 40 containing a notch 42. A first end portion 44 and a second end portion 46 of the pivot member 36 are located on each side of the notch 42. The end portions 44 and 46 each have identical cut outs 48 on opposite sides of the pivot member 36. A through bore 54 is located at the center of each cut out 48. The cut out 48 on each pivot member 36 engages a cooperating cut out 48 from an abutting pivot member 36 to form an endless elliptical loop. The links 32 made from stainless steel each have a bore 50 at each end through which is inserted rod 34 to connect the links together and to pivot member 36. A nut 56 end caps rod 34 and holds the pivot member 36 in place at the edge of each screen assembly section 28. The pivot member 36 is made from a high strength polymer, such as a polyamide or polycarbonate.

Figure 3:
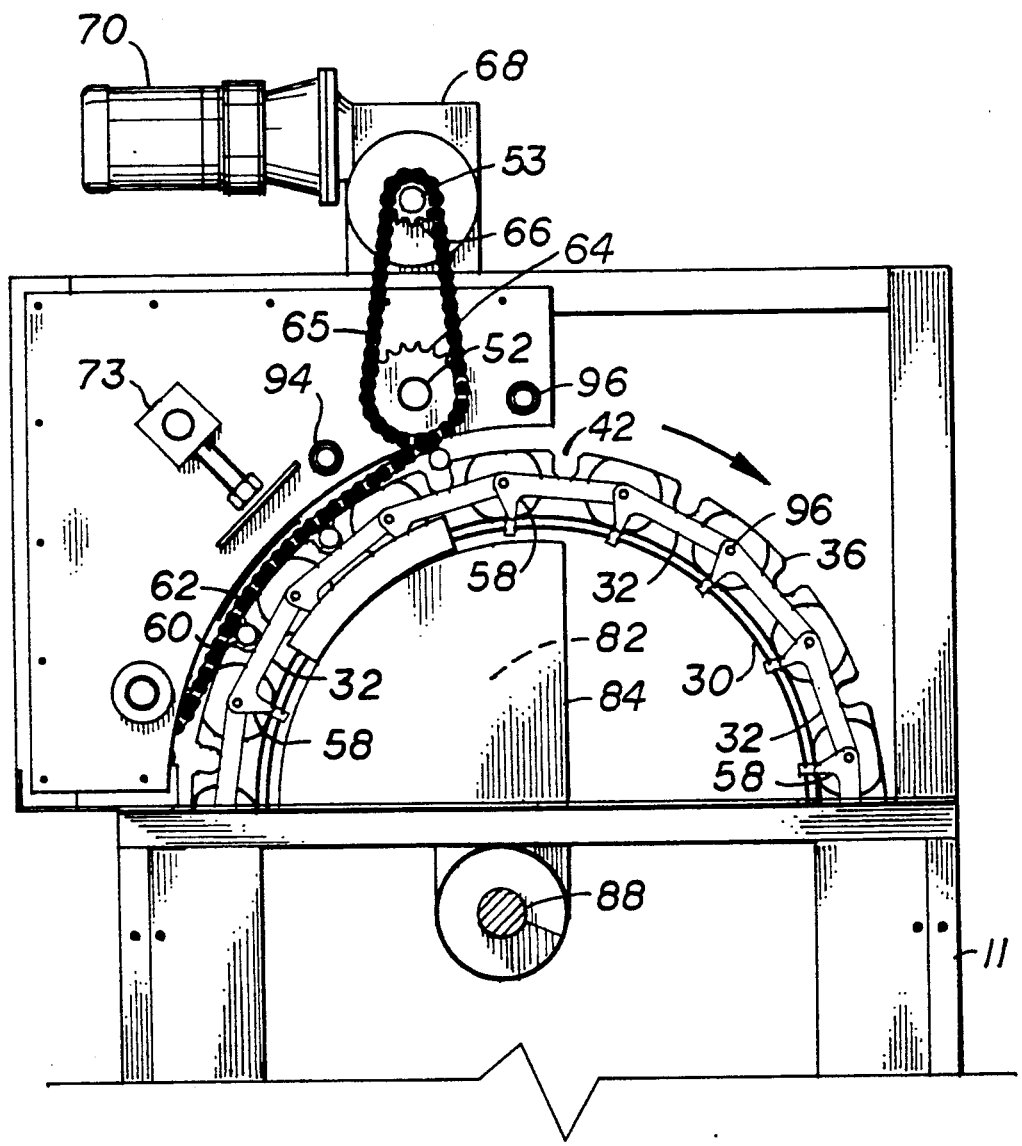
FIG. 3 is a front end view of the top portion of the apparatus with the cover plate shown in FIG. 1 removed.

In each screen assembly section 28 the bottom surface 38 of the pivot member 36 is proximal to the interior of chamber 18 with a foot 58 on each link 32 protruding below the pivot member 36 so as to face inwardly in chamber 18. The notch 42 of pivot member 36 is engaged by a lug 60 mounted on a bottom surface of an endless loop gear chain 62 as seen in FIG. 3.

The endless loop transfer chain 65 is engaged at one end to gear 66 and another end to a drive gear 64. The drive gear 64 drives shaft 52 as seen in FIG. 3. Shaft 53 is directly connected to a gear reducer 68 that is driven by a drive motor 70 mounted on the top of the water filter screen apparatus 10. Rotation of chain 62 by gear 74 driven by shaft 52 causes the lugs 60 to engage within the hole 42 of the pivot member 36 and causes the entire screen assembly 26 to move in a clockwise direction. At least two lugs are always in engagement with adjacent pivot members 36 while the screen assembly is moving.

Figure 4:
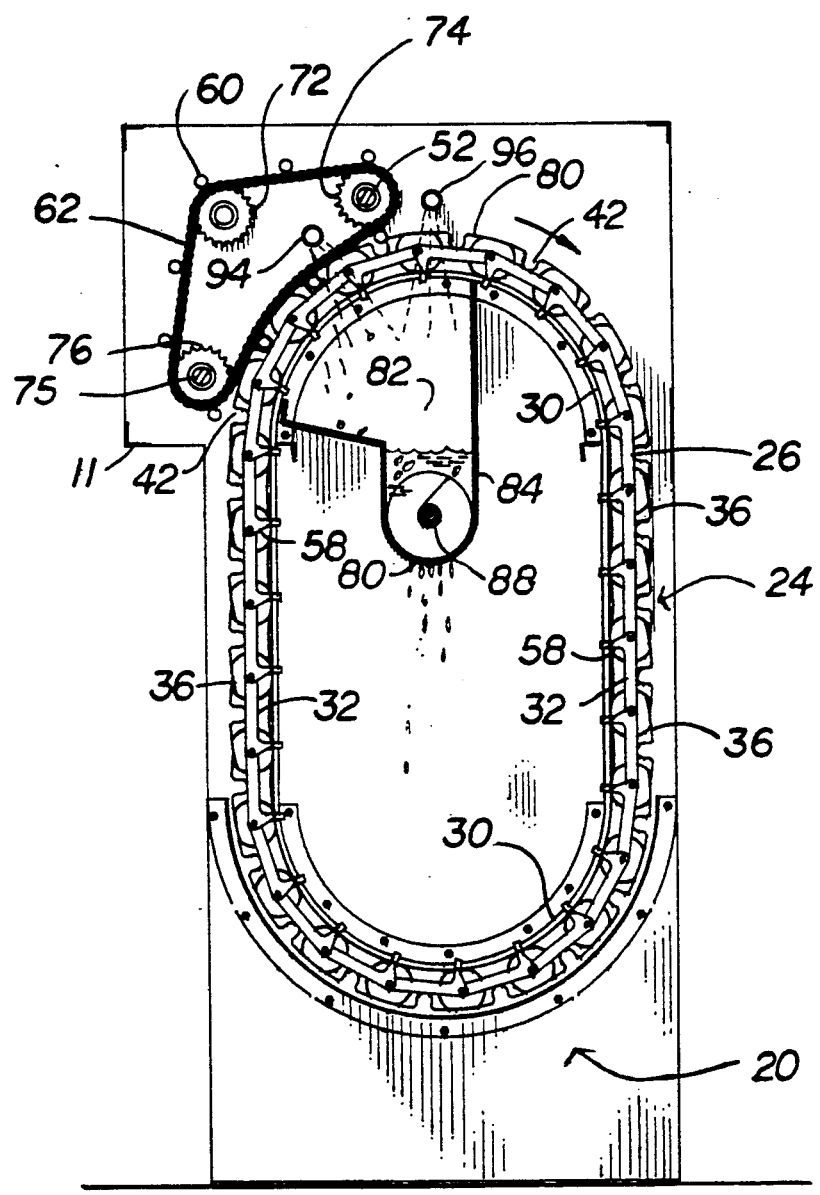
FIG. 4 is a cut away side elevation view of the filter screen along lines 4—4 of FIG. 5 showing a loop section, a driving chain and hopper chamber.
Figure 5:
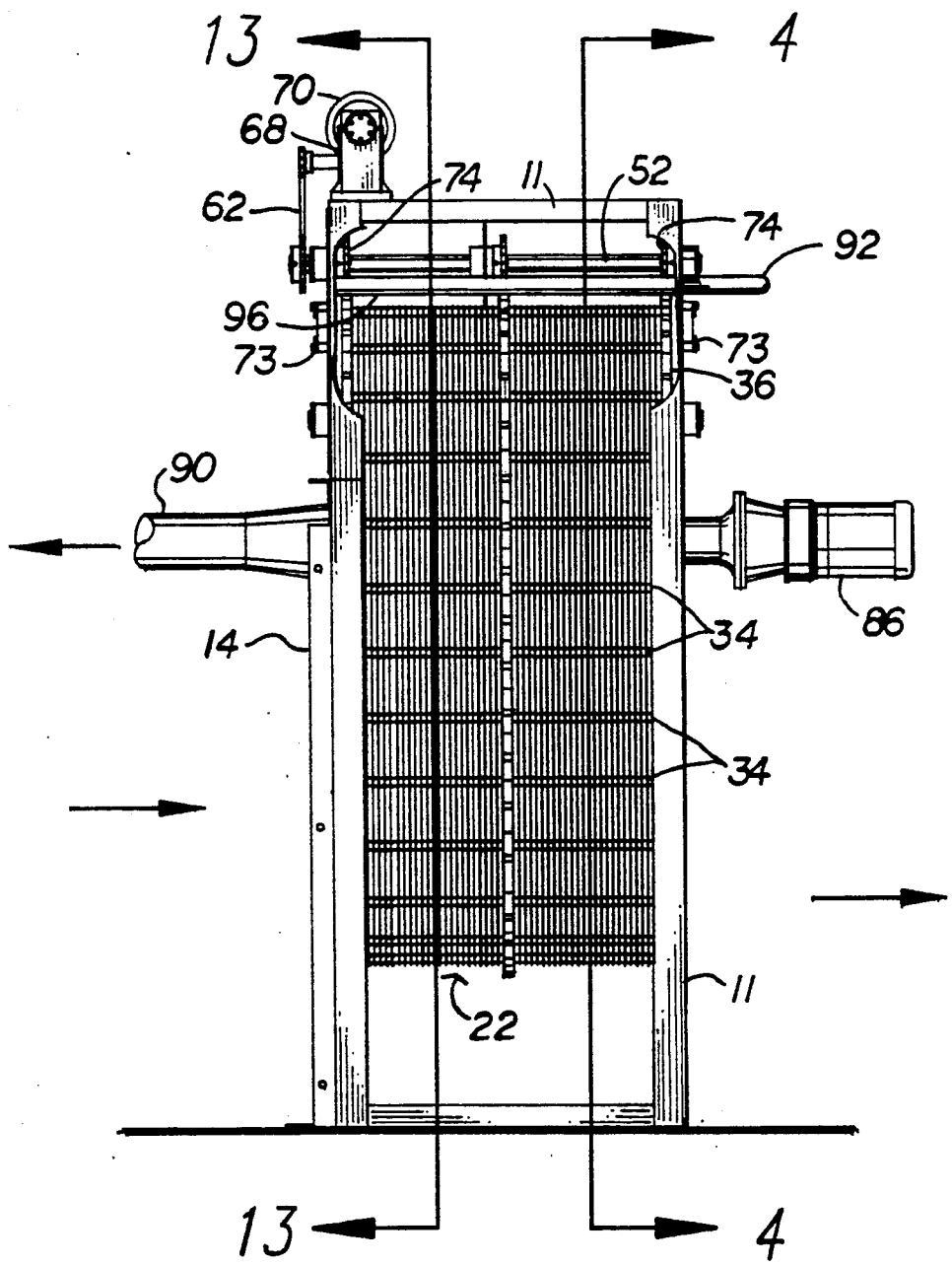
FIG. 5 is a right side elevation view of the water filter screen apparatus.
Figure 6:
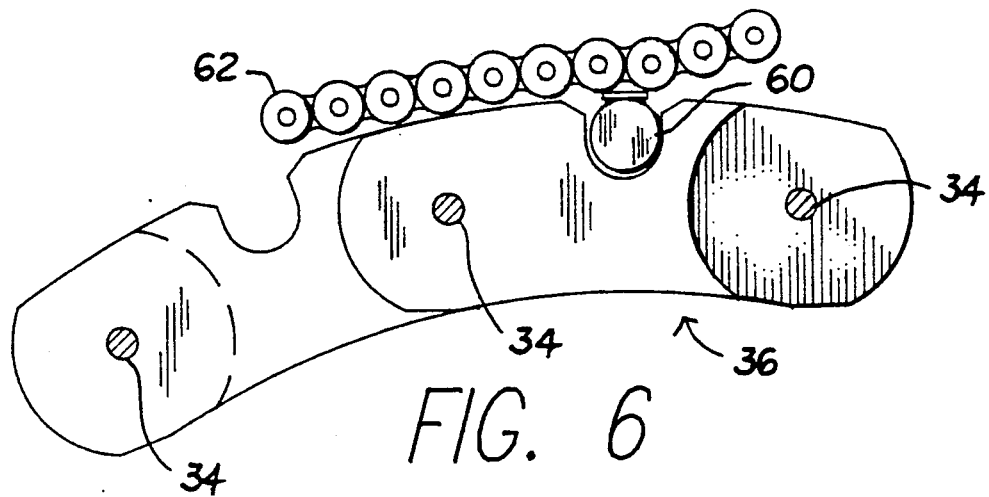
FIG. 6 is a side elevation view of a pair of screen pivot members in engagement with a drive chain lug.

As seen in FIG. 4 an adjustment gear 72 moves in response to drive gear 74 and together with idler gear 76 supports chain 62. Shaft 75 connects all three idler gears 76. This arrangement adjusts tension on the screen assembly 26. Tension is manually adjusted on gear 72 to desired levels by movement of a bolt on tension adjusting bracket 73.

Figure 2:
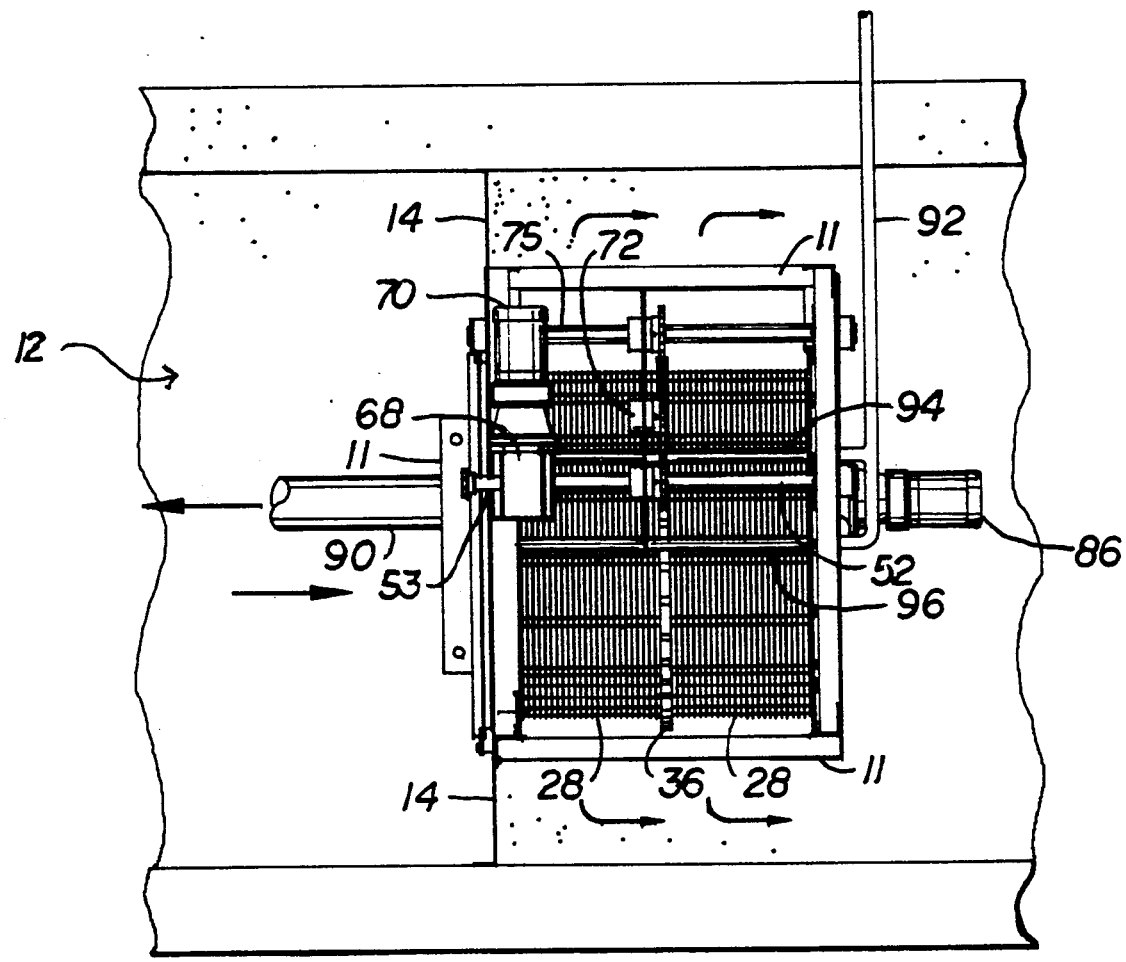
FIG. 2 is a top plan view of the apparatus.

A water flushing system having an inlet pipe 92 leading to spray headers 94 and 96 flushes the top of the screen assembly 26 as seen in FIG. 2 to force all solid material down into a hopper 82 which is enclosed in a housing 84 as seen in FIG. 4. A drive motor 86 turns a waste screw 88 at about 8-15 RPM to wring liquid waste out of the solids and force the solids out through pipe 90 into a disposal container. The liquids fall through holes 80 in housing 84 into the chamber 18. The screw 88 is usually about six inches in width.

The inner chamber 18 has a depth of about thirty-two inches and a width of thirty-six inches and can handle about twenty million gallons of water per day.

The links 32 and the support rods 34 together with the chains and other metal fittings are made from stainless steel to retard rusting and all exterior surfaces of the housings are painted to protect the surfaces from rusting. Link washers 33 are made from plastic.

Having thus described the invention, what is claimed and secured by Letters Patent is:

1. In an apparatus for fine polishing a water effluent having a drum type housing containing a continuously rotating screen assembly mounted within an interior portion of the housing, a flushing device mounted exterior to a top portion of the housing, the housing having a front open entrance for receiving the water effluent and a back baffle wall together with side and bottom exits for liquids, the rotating screen assembly having at least two endless loop filter sections, each section having multiple spaced apart adjacent loops, the loops containing end-to-end longitudinally mounted links, each link connected to another link in an adjacent loop by a horizontally mounted link connecting rod, each filter section capped at each side by a pivot member, the pivot member having at least two lateral through bores to accommodate one of the horizontally mounted link connecting rods in each bore, the improvement comprising, means designed for breaking up compacted fecal matter including each link further including a foot projecting towards the interior portion of the housing, the pivot member having a notch on a top surface to engage a lug integral with an endless loop chain driven by motor driven gears positioned outside the interior portion of the housing to drive the filter sections, the top surface of the pivot member being distal from the interior portion of the housing, the flushing device having at least two headers spraying water onto the endless loop filter sections as they reach a top portion of the housing, so that entrained debris of more than 0.5 mm diameter is washed down into a hopper mounted within the interior portion of the housing, the hopper leading to a housing containing a waste screw to wring liquid out of the solids, the liquids falling by gravity through holes in the bottom of the waste screw housing into the interior portion of the drum housing and the solid waste being conveyed out of the apparatus for solid waste disposal.

2. The improved apparatus according to claim 1 wherein the motor employed to drive the filter sections is a variable speed motor and a tensioning device is used to keep tension on the endless loop chains engaged to the pivot members.

3. The improved apparatus according to claim 2 wherein the tensioning device is an adjusting gear driven by a low horsepower hydraulic motor.

4. The improved apparatus according to claim 1 wherein the pivot members located on the exterior side of each screen assembly filter section is enclosed within a guide track mounted within the interior of the drum type housing.

5. The improved apparatus according to claim 1 wherein the interior portion of the drum type housing has a width of thirty-six inches and can accommodate up to twenty million gallons of water per day.

6. The improved apparatus according to claim 1 wherein the waste screw turns at a rate of about 8 to 5 revolutions per minute.

7. The improved apparatus according to claim 1 wherein at least two lugs attached to the endless loop chain are in engagement respectively with a notch from two abutting pivot members at all times during rotation of the screen assembly.

* * * * *